United States Patent [19]

Fournier et al.

[11] Patent Number: 4,921,258
[45] Date of Patent: May 1, 1990

[54] ADAPTER SEAL

[75] Inventors: Paul J. E. Fournier, Jackson; Ernest F. Kulikowski, Marshall, both of Mich.

[73] Assignee: Aeroquip Corporation, Jackson, Mich.

[21] Appl. No.: 229,445

[22] Filed: Aug. 8, 1988

[51] Int. Cl.$^5$ .............. F16J 15/16; F16J 15; F16J 32; F16K 15/14; F16K 24/04

[52] U.S. Cl. .................. 277/29; 137/217; 137/526; 141/302; 141/348; 277/152; 277/201; 277/206 R; 277/207 R; 277/215; 285/33; 285/924

[58] Field of Search ............ 277/12, 27, 29, 201, 277/202, 207 R, 215, 70, 205, 206 R, 152; 285/1, 33, 304, 910, 924; 137/526, 217; 141/302, 348

[56] References Cited

U.S. PATENT DOCUMENTS

| | | | |
|---|---|---|---|
| 2,182,797 | 12/1939 | Dillon | 277/206 X |
| 2,293,564 | 8/1942 | Schnell | 277/206 X |
| 2,587,810 | 3/1952 | Beyer | 277/206 X |
| 2,923,308 | 2/1960 | Shohan | 277/205 X |
| 2,962,314 | 11/1960 | Rickard | 277/205 |
| 2,981,232 | 4/1961 | Peras | 277/201 X |
| 3,173,698 | 3/1965 | Haberkorn | 277/205 |
| 4,284,280 | 8/1981 | Bertram et al. | 277/70 X |
| 4,458,717 | 7/1984 | Boland | 137/496 |
| 4,638,842 | 1/1987 | Hawley et al. | 141/302 |
| 4,646,775 | 3/1987 | Traylor | 137/217 X |

Primary Examiner—Allan N. Shoap
Attorney, Agent, or Firm—Beaman & Beaman

[57] ABSTRACT

A seal for a fitting adapter for fluid couplings wherein a coupling probe is received within a recess within the other coupling half and the seal prevents the creation of subatmospheric pressures during withdrawal of the probe. The seal includes a lip or flapper valve component which establishes sealing during coupling pressurization, and permits atmospheric pressure to flow around the lip during coupling disconnection.

6 Claims, 1 Drawing Sheet

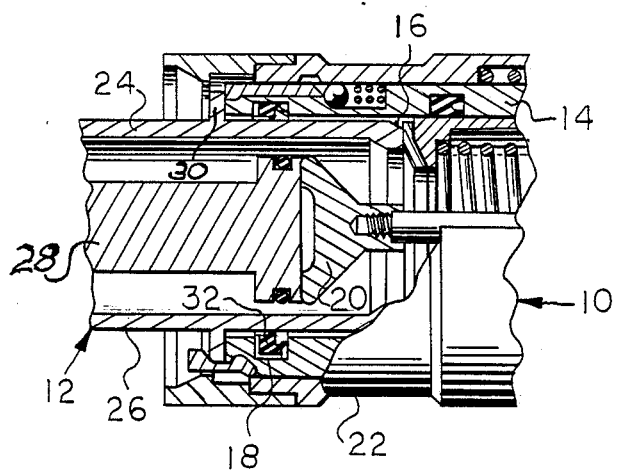
FIG 1
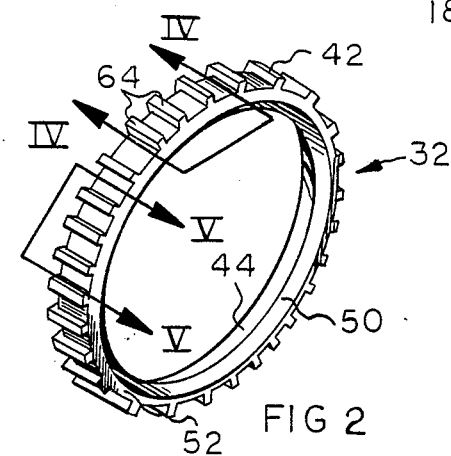
FIG 2
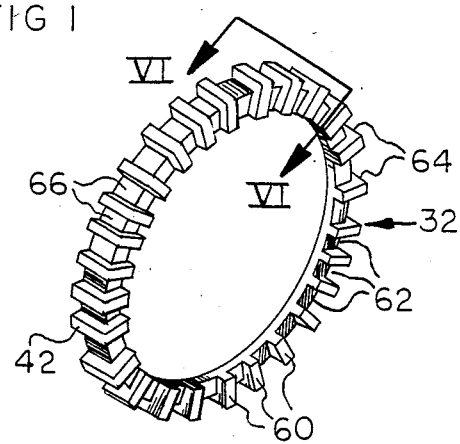
FIG 3
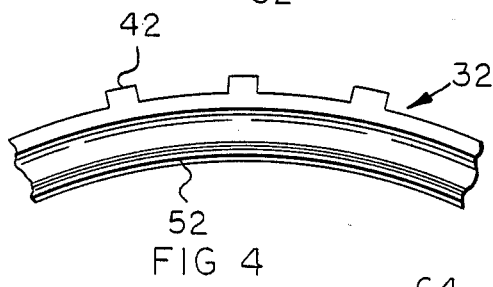
FIG 4
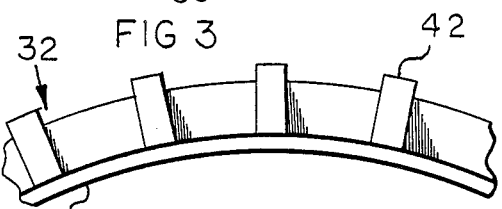
FIG 5
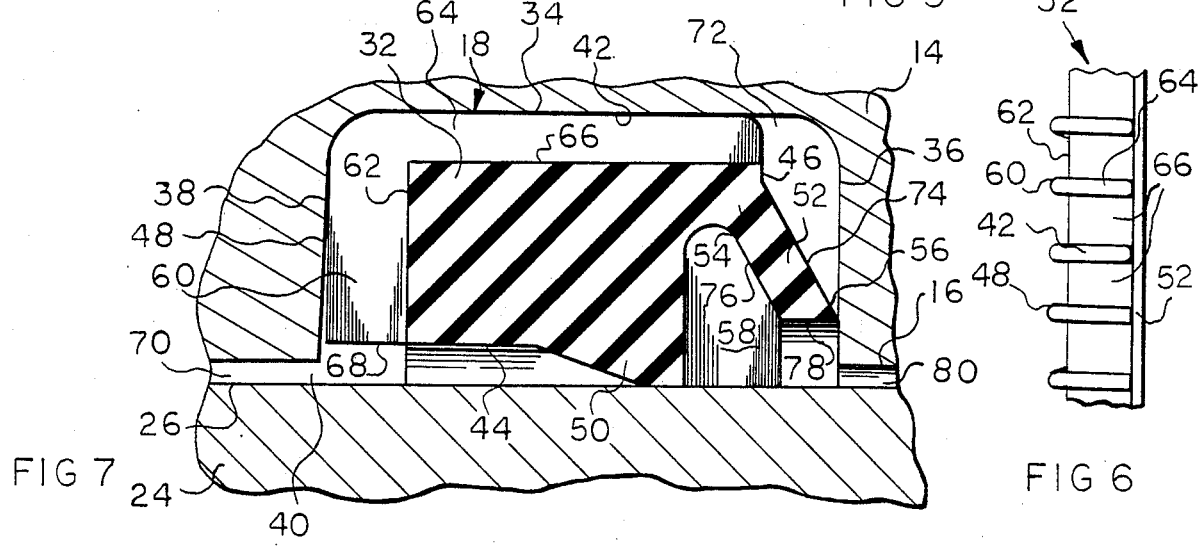
FIG 7
FIG 6

ADAPTER SEAL

BACKGROUND OF THE INVENTION

A common fluid coupling construction is to employ complementary male and female components which, when fully interconnected, permit the flow of fluid through the coupling. The coupling halves may include self-sealing valve structure which is closed when the coupling halves are separated, and automatically opens during the coupling of the intermating components.

The male probe is normally of a cylindrical construction and an annular seal within the female half recess sealingly engages the male cylindrical surface. During disconnection of the coupling halves a subatmospheric pressure or vacuum will be created within the female part as the probe is withdrawn. This subatmospheric pressure increases the force necessary to disconnect the coupling parts. This effect is quite serious when encountered in relatively large hose coupling sizes such as those used to refuel aircraft, and difficulty in disconnecting the coupling parts of a refueling system creates a serious safety hazard.

It is an object of the invention to provide a fluid coupling seal which effectively seals intermating coupling halves during fluid flow through the coupling but prevents the creation of a vacuum within the coupling during disconnection of the coupling parts.

Another object of the invention is to provide a vacuum breaking seal within a fluid coupling which is of an economical construction to manufacture and is dependable in operation.

Yet another object of the invention is to provide a vacuum breaking seal for intermating coupling parts which may be easily retrofitted to existing couplings without requiring modification thereto.

A further object of the invention is to provide a vacuum breaking seal which may be readily manufactured, easily installed in a fluid coupling, even though retrofitted to an existing design, and prevents the formation of subatmospheric pressure within the female coupling part during withdrawal of the male probe.

In the practice of the invention an annular recess intersects a cylindrical surface of one of the coupling halves, usually the passage of the female member. The other coupling half, such as the cylindrical male probe, is received within the recess, and an annular resilient seal located within the groove sealingly engages the cylindrical surface of the probe. The seal prevents leakage during the flow of pressurized medium through the coupling halves, and a sealed relationship between the female part and the male probe part occurs as soon as the male probe surface is engaged by the seal.

In accord with the invention, the annular seal includes an inner portion engaging the probe cylindrical surface and thereby establishes a seal between the male and female parts. Additionally, the annular seal includes first and second radially extending ends which are in an opposed relationship to the radial sides of the groove in which the seal is received.

An annular lip or flapper seal is homogeneously defined on the seal body having a base connected to an end of the seal and a deformable free end which may sealingly engage a groove side. The lip is obliquely related to the axis of the seal and includes an inner pressure face which is subjected to the pressurized medium within the coupling whereby such pressure forces the lip against the groove end and prevents leakage about the outer circumference of the seal during coupling pressurization.

The end of the seal opposite to that end upon which the lip is defined is exposed to atmospheric pressure, and this seal end includes a plurality of radially extending channels defined by radially ribs. In a like manner the outer circumference of the seal is provided with a plurality of axially extending channels in communication at one end with the seal end channels, and at the other end communicate with the atmospheric side of the lip which is opposed to the lip pressure side.

During coupling connection and operation the internal pressure within the coupling is prevented from escaping due to the sealed relationship between the male probe and the seal inner bore rib, and medium cannot flow about the coupling as pressure acting upon the lip maintains a sealed relationship between the lip free end and the associated groove surface.

When the probe is being withdrawn from the female coupling half such axial probe displacement creates a subatmospheric pressure within the female half recess. Upon such occurrence, atmospheric pressure flows around the seal through the channels defined upon the seal end and circumference exposing the atmospheric side of the seal to atmospheric pressure while the pressure face of the seal is exposed to subatmospheric pressure. The atmospheric pressure deforms the lip permitting atmospheric pressure to flow about the lip to enter the female half recess equalizing the pressures and permitting the parts to be easily separated.

A seal in accord with the invention may be easily retrofitted to existing couplings wherein the female coupling includes a bore having a seal recess by merely removing the old seal and inserting the seal of the invention.

BRIEF DESCRIPTION OF THE DRAWINGS

The aforementioned objects and advantages of the invention will be appreciated from the following description and accompanying drawings wherein:

FIG. 1 is an elevational, diametrical, sectional view of coupling parts shown in a fully connected relationship utilizing the seal of the invention, FIG. 2 is a perspective view of the seal of the invention illustrating the end upon which the annular lip is defined, FIG. 3 is a perspective view of the seal of the invention illustrating the opposite end of the seal with respect to FIG. 2, FIG. 4 is a detail, enlarged, elevational, sectional view taken along Section IV—IV of FIG. 2, FIG. 5 is an enlarged, detail, elevational view as taken along Section V—V of FIG. 2, FIG. 6 is an enlarged, end, elevational view as taken along Section VI—VI of FIG. 3, and FIG. 7 is a detail, enlarged, sectional view of a vacuum breaking seal in accord with the invention with the lip illustrated in sealing engagement with the associated groove side.

BRIEF DESCRIPTION OF THE PREFERRED EMBODIMENT

In FIG. 1 an example of the type of coupling utilizing the seal of the invention is illustrated. The female coupling half part is generally represented at 10, while the male coupling half part is represented at 12. These components may take the form of the nozzle construction as shown in the assignee's U.S. Pat. No. 4,638,842 and the overall construction of the type of coupling utilizing the inventive concepts can be appreciated from this patent disclosure and the components of the coupling not pertinent to the basic concept of the instant invention are only generally discussed below.

The female coupling half 10 includes a cylindrical body 14 defining an open end cylindrical recess 16. A groove 18 of an annular configuration intersects the recess as appreciated from FIGS. 1 and 7. The female coupling half includes valve structure 20 and a locking sleeve 22 is reciprocally mounted upon the body.

The male half 12 of the coupling includes a cylindrical probe 24 having a cylindrical surface 26 and the probe is receivable within the recess 16. An internal valve 28 seals the passage of the probe 24, and a stop shoulder 30 and locking structure is defined on the probe for maintaining the coupling parts in the fully interconnected condition shown in FIG. 1 as will be appreciated from U.S. Pat. No. 4,638,842.

The seal ring 32 seals the coupling half 10 relative to the coupling half 12 when the parts are interconnected as the seal establishes a fluid-tight relationship with its groove 18 and the probe 24 when received within the seal.

With reference to FIG. 7, it will be appreciated that the groove 18 includes a base side 36 of a cylindrical form concentric to the axis of the recess 16. The groove further includes radial space sides 36 and 38 perpendicularly disposed to the base 34 and intersecting the recess 16 so as to define a groove open side 40.

The seal ring 32 comprises an annular body formed of an elastomeric material such as rubber, neoprene, synthetic plastic or the like. The body is of a generally cylindrical configuration having an outer cylindrical circumference 42, an inner bore 44 defining a seal surface, an end 46 and an opposite end 48.

As will be appreciated from FIG. 7 the axial dimension of the seal 32 is slightly less than that of the groove 18 and the seal body circumference 42 engages the groove base 34 while the body end 48 engages the groove side 38.

The seal body bore is provided with an annular rib or projection 50 which extends inwardly toward the seal axis and sealingly and slidably engages the probe surface 26 when the probe is received within the recess 16. The minimum diameter of the projection 50 is slightly less than the diameter of the surface 26 as to produce a snug sliding fit of a fluid-tight character.

The inner end 46 of the seal ring 32 is provided with an annular flap or lip 52 homogeneously formed of the seal body material having a base 54 and a free end 56 terminating in a sharp apex. The base 54 is located adjacent the outer regions of the seal, and the lip 52 obliquely extends toward the seal axis wherein, under normal conditions, the free end 56 sealingly engages the groove side 36 as shown in FIG. 7. The seal body includes a void 58 for defining the lip 52.

A plurality of ribs 60 are defined in the seal body end 48 forming a plurality of radial channels 62, and in a similar manner, a plurality of ribs 64 are formed in the seal circumference 42 defining a plurality of axially extending channels 66. Aligned channels 62 and 66 intersect and communicate with each other as will be apparent from FIGS. 3, 6 and 7. As will be appreciated from FIG. 7, the channels 62 terminate at the edge 68 communicating with the clearance 70 between the coupling half 10 and the probe 24 and the clearance 70 is in communication with the atmosphere.

The right end of the channels 66, as viewed in FIG. 7, terminate short of the groove side 36 communicating with the groove chamber 72. Thus, the chamber 72 will be in communication with the atmosphere through the channels 62 and 66.

For purpose of explanation of the operation of the seal 32 the lip surface 74 is designated the atmosphere or exhaust face of the lip 52, while the surfaces 76 and 78 are jointly designated the pressure face of the lip as these surfaces will be in communication with the coupling pressurized medium through the clearance 80 adjacent the probe.

In operation, when the probe 24 is inserted into the recess 16 the seal projection 50 will engage the probe surface 26 to establish a sealed relationship between the coupling halves 10 and 12. The probe is fully inserted into the recess 16 to the condition shown in FIG. 1 and upon the valve 20 being displaced by its control handle, see U.S. Pat. No. 4,638,842, the valve 28 is also displaced permitting fluid flow between the coupling parts. During this time, the pressurized medium being conveyed will enter the clearance 80 and be applied against the lip pressure face 76/78 holding the apex end 56 in a sealed relationship to the groove side 36 and the lip 52 prevents leakage around the seal ring through the channels 62 and 66.

To disconnect the coupling halves 10 and 12 the locking mechanism 22 is released and the probe 24 is moved to the left with respect to the recess 16, FIG. 1. Upon the valve 20 being displaced to the right by its control handle the valve 28 also closes terminating the flow of fluid. Movement of the probe 24 to the left creates a subatmospheric pressure within the clearance 80, void 58 and against the lip face 76–78. Such a subatmospheric pressure or vacuum would resist further disconnection of the coupling halves except that the presence of the channels 62 and 66 permits atmospheric pressure to be applied against the lip face 74 and as the atmospheric pressure against the face 74 is greater than the subatmospheric pressure against face 76–78 the atmospheric pressure will deform the lip 52 toward the seal ring void 58 permitting atmospheric pressure to pass around the apex end 56 and equalize the pressures within the clearances 70 and 80. Thus, this vacuum-breaking aspect of the seal ring 32 prevents excessive disconnection forces from occurring.

The seal ring lip 52 is flexible enough to allow unseating during withdrawal of the probe, but is stiff enough to normally permit the apex end 56 to engage the groove surface 36 to provide a positive seal for the system pressure and this seal is augmented by the positive pressures of the pressurized medium being conducted.

The ribs 64 firmly engage the groove base 34, and the channels 66 also provide voids in the cross section to allow for swelling of the seal material as may occur due to exposure to the medium being transferred, such as aircraft fuel.

The ribs 60, in addition to defining channels 62, axially position the seal within the groove 18, and the channels 62 will also provide voids for accommodating swelling of the seal material.

The seal 32 is flexible enough to permit ready insertion into the groove 18, and the seal of the invention may be readily substituted in existing couplings, such as that shown in U.S. Pat. No. 4,638,842. Thus, retrofitting of the seal of the invention in existing couplings is readily accomplished.

It is appreciated that various modifications to the inventive concepts may be apparent to those skilled in the art without departing from the spirit and scope of the invention, for instance the groove receiving the seal ring could be formed in the probe 24.

We claim:

1. A vacuum breaking adapter seal for a fluid coupling including a female member having a cylindrical surface bore receiving a male member cylindrical surface probe comprising in combination, an annular groove circumferentially defined in one of said members' cylindrical surface having a base side, spaced opposed first and second sides and an open side adjacent the cylindrical surface of the other member upon the probe being received within the bore, a resilient annular seal ring within said groove, said ring including a base, a first axial end, a second axial end and a seal surface extending toward the cylindrical surface of said other member through said groove open side, first seal means defined on said ring seal surface comprising an annular radially extending projection sealingly engaging said other member cylindrical surface, deformable second seal means defined upon said ring first end having a pressure face disposed toward said other member and an atmospheric face disposed toward said groove base side, said second seal means sealingly engaging said groove first side when said pressure face is exposed to the coupling internal pressure and is deformed from a sealed engagement with said groove first side upon said atmospheric face being exposed to atmospheric pressure and said pressure face is exposed to subatmospheric pressure during withdrawal of the male member from the female member, and passage means defined in said seal ring establishing communication between said second seal means atmospheric face and the atmosphere.

2. In a vacuum breaking adapter seal as in claim 1, said second seal means comprising an annular lip seal having a free end apex for sealingly engaging said groove first side.

3. In a vacuum breaking adapter seal as in claim 2, said passage means comprising channels defined in said seal ring base and second axial end.

4. In a vacuum breaking adapter seal as in claim 3, said passage means comprising a plurality of radially extending channels defined in said seal ring base and said second axial end, each of said base channels communicating with a second axial end channel.

5. A vacuum breaking adapter seal comprising, in combination, an annular body of resilient material having an axis, first and second ends, an outer circumference and a bore, an annular flexible lip defined on said first end having a free end obliquely extending away from said body and in the direction of said axis, an annular seal ridge defined within said bore extending toward said axis, a first radially extending channel defined in said second end intersecting said bore and said circumference, and a second channel defined in said circumference intersecting said first channel and said first end.

6. In a vacuum breaking adapter seal as in claim 5, a plurality of first and second channels defined in said second end and said circumference, respectively, each first channel intersecting with a second channel.

* * * * *